US009357690B2

(12) United States Patent
Huegerich et al.

(10) Patent No.: US 9,357,690 B2
(45) Date of Patent: Jun. 7, 2016

(54) TRACTOR-IMPLEMENT COUPLING MECHANISM

(71) Applicant: Deere & Company, Moline, IL (US)

(72) Inventors: Tony J. Huegerich, Cedar Falls, IA (US); Steven A. Duppong, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/520,692

(22) Filed: Oct. 22, 2014

(65) Prior Publication Data

US 2016/0113188 A1    Apr. 28, 2016

(51) Int. Cl.
  *A01B 59/042*    (2006.01)
  *B60D 1/64*    (2006.01)
  *B60K 17/28*    (2006.01)
  *B60D 1/00*    (2006.01)

(52) U.S. Cl.
  CPC ............ *A01B 59/042* (2013.01); *B60D 1/64* (2013.01); *B60K 17/28* (2013.01); *B60D 2001/008* (2013.01)

(58) Field of Classification Search
  CPC .. A01B 59/042; A01B 59/043; A01B 59/069; A01B 59/062; B60D 1/64; B60D 1/36; B60D 1/363; B60D 2001/008; B60K 17/28
  See application file for complete search history.

(56) References Cited

U.S. PATENT DOCUMENTS

| 2,429,761 | A | 10/1947 | Ketel |
| 4,368,899 | A | 1/1983 | Smalley et al. |
| 4,738,463 | A | 4/1988 | Poore et al. |
| 4,763,743 | A | 8/1988 | Ridgway |
| 5,062,321 | A | 11/1991 | Koenig et al. |
| 7,290,977 | B2 * | 11/2007 | Albright ............... E02F 3/3627 37/468 |
| 7,717,189 | B2 | 5/2010 | Shoup et al. |
| 8,770,612 | B2 | 7/2014 | Wendte et al. |
| 2012/0068438 | A1 | 3/2012 | Kollath |
| 2013/0133905 | A1 | 5/2013 | Valet et al. |
| 2013/0277943 | A1 * | 10/2013 | Wendte ................. B60D 1/363 280/421 |

FOREIGN PATENT DOCUMENTS

| EP | 2676534 B1 | 12/2013 |
| FR | 2995756 A1 | 3/2014 |

OTHER PUBLICATIONS

GDS GmbH, Gangl Docking System, product description web page, retrieved Oct. 8, 2014 from http://www.ganglsystems.com/en/product/.

* cited by examiner

*Primary Examiner* — Drew Brown (57) ABSTRACT

A coupling assembly couples a towed implement having a tongue to a vehicle having a pickup hitch. The coupling assembly includes a coupler manifold which is mounted to the vehicle and which supports vehicle couplers. An implement coupler frame is attached to the tongue, and an implement plate is movably coupled to the implement coupler frame. The implement plate supports implement couplers for mating engagement with the vehicle couplers. The manifold is engagable with the implement plate. Spring members are biased to urge the implement plate towards the manifold.

20 Claims, 8 Drawing Sheets

TRACTOR-IMPLEMENT COUPLING MECHANISM

TECHNICAL FIELD

The present disclosure relates to a coupling mechanism for connecting a tractor to an implement.

BACKGROUND

Tractors and utility vehicles used for agricultural work may be coupled to implements which have a variety of couplers and/or connectors which must be connected to corresponding tractor couplers and/or connectors. Hooking up the drawbar, PTO, hydraulic and electrical connections between a tractor and an implement can take significant time because of the multiple trips required from the cab and the many connections to make. With multiple connections also comes the risk of hooking them up incorrectly which could cause damage or increase implement set up time. The time spent connecting the implement could be better used doing productive work in the field. Implements are not utilized full time with a tractor, so it is desirable that a coupling mechanism allow quick, easy removal and reinstallation of the implement. An automatic coupling mechanism is needed for an implement that can be quickly and easily connected and disconnected under a tractor.

SUMMARY

According to an aspect of the present disclosure, a coupling assembly is provided for coupling a towed implement to a vehicle. The implement has a tongue, and the vehicle has a pickup hitch which has a drawbar slidable in a pivotal housing. The coupling assembly includes a coupler manifold, an implement coupler frame fixedly attached to the tongue, and an implement plate. The coupler manifold is mounted to the vehicle. The coupler manifold supports a plurality of vehicle couplers. The implement plate is movably coupled to the implement coupler frame, and supports a plurality of implement couplers for mating engagement with the vehicle coupler.

The implement coupler frame supports an implement PTO coupler member which is releasably engagable with a vehicle PTO device. The manifold is engagable with the implement plate. A plurality of support brackets are mounted to the coupler frame. Each support bracket has a bore extending therethrough. The coupling assembly also includes a plurality support bolts. Each support bolt is slidably received by a corresponding support bracket. An end of each support bolt is attached to the implement plate. The coupling assembly also includes a plurality of resilient spring members mounted between the coupler plate and the support brackets. Each spring member is biased to urge the implement plate towards the manifold. Each spring member is a coil spring mounted around a corresponding support bolt.

DETAILED DESCRIPTION OF THE DRAWINGS

At least one example embodiment of the subject matter of this disclosure is understood by referring to FIGS. 1 through 8.

Referring to FIGS. 1-4, a coupling mechanism 10 is provided for coupling a vehicle or prime mover, such as a tractor, to an implement towed by the vehicle. A manifold or housing member 12 is mounted to a plate 14. Plate 14 is mounted on an outer housing 84 of a pick up hitch 80 of the tractor (see FIGS. 7 and 8). An implement coupler unit 16 is fixed to a tongue 15 of the implement. The coupler unit 16 includes a base 17 and a coupler frame 19 with frame arms 19A and 19B attached to sides of the base 17.

Figure 2:
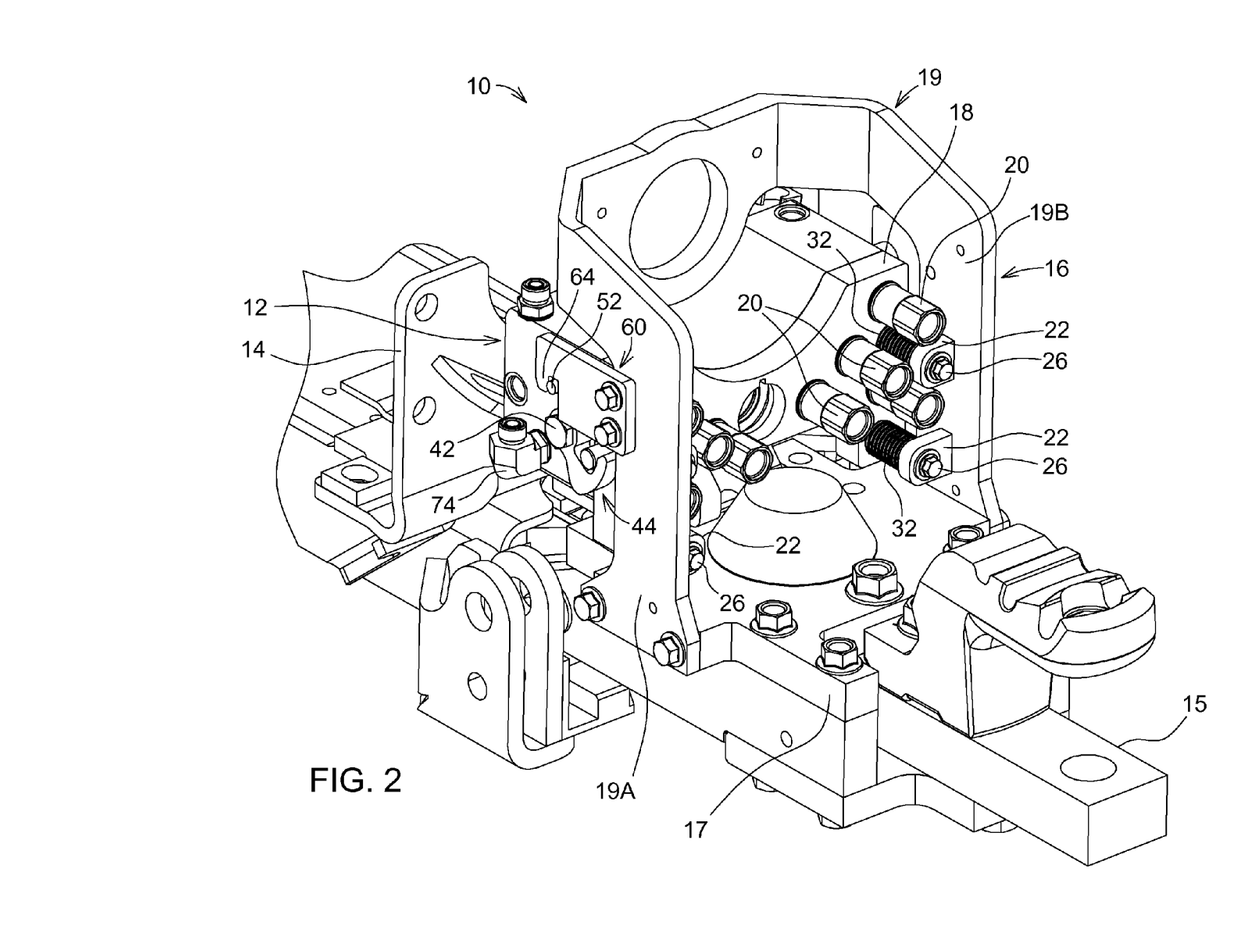
FIG. 2 is a perspective view of the coupling mechanism of FIG. 1.
Figure 4:
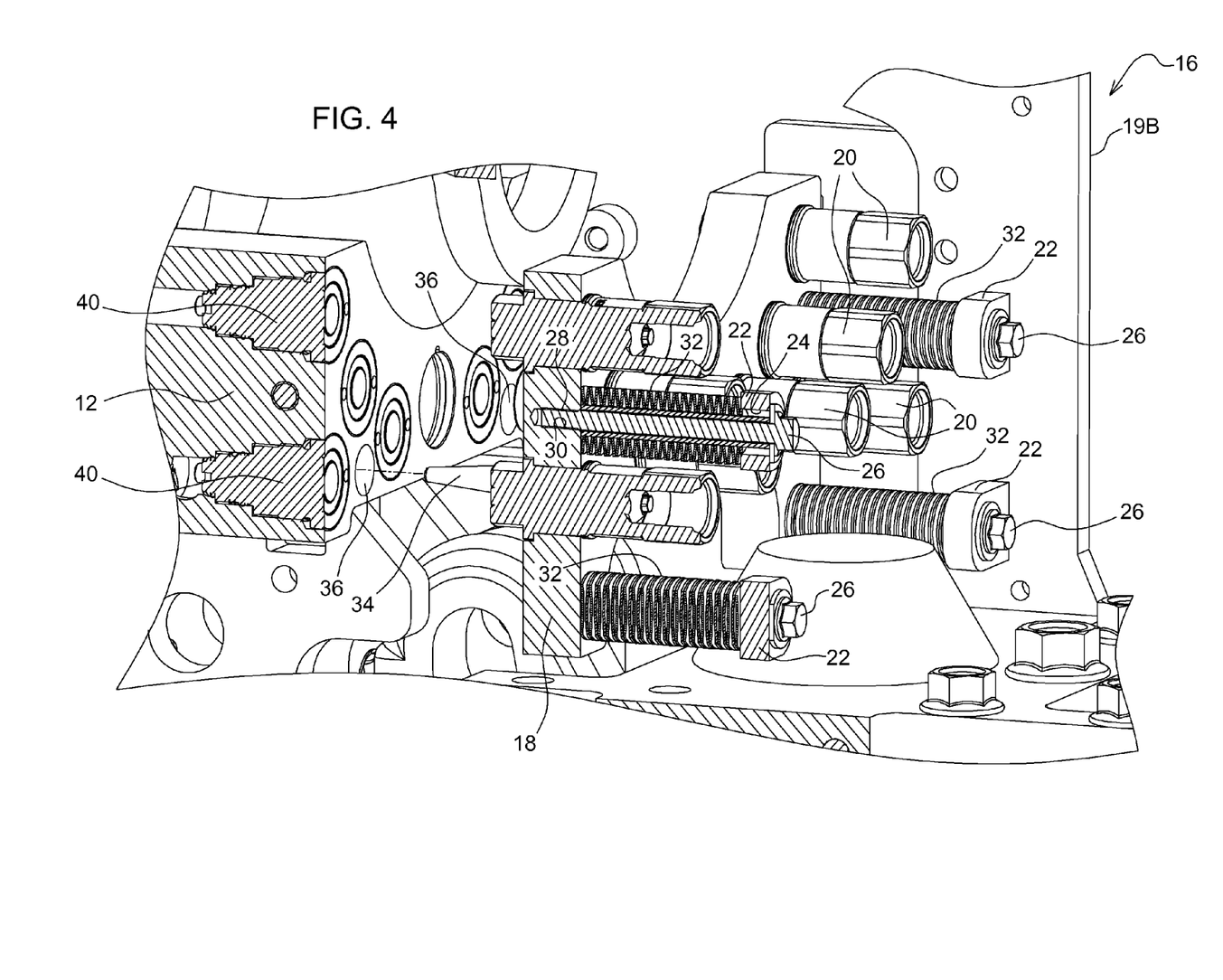
FIG. 4 is a sectional view the coupling mechanism of FIG. 2.
Figure 7:
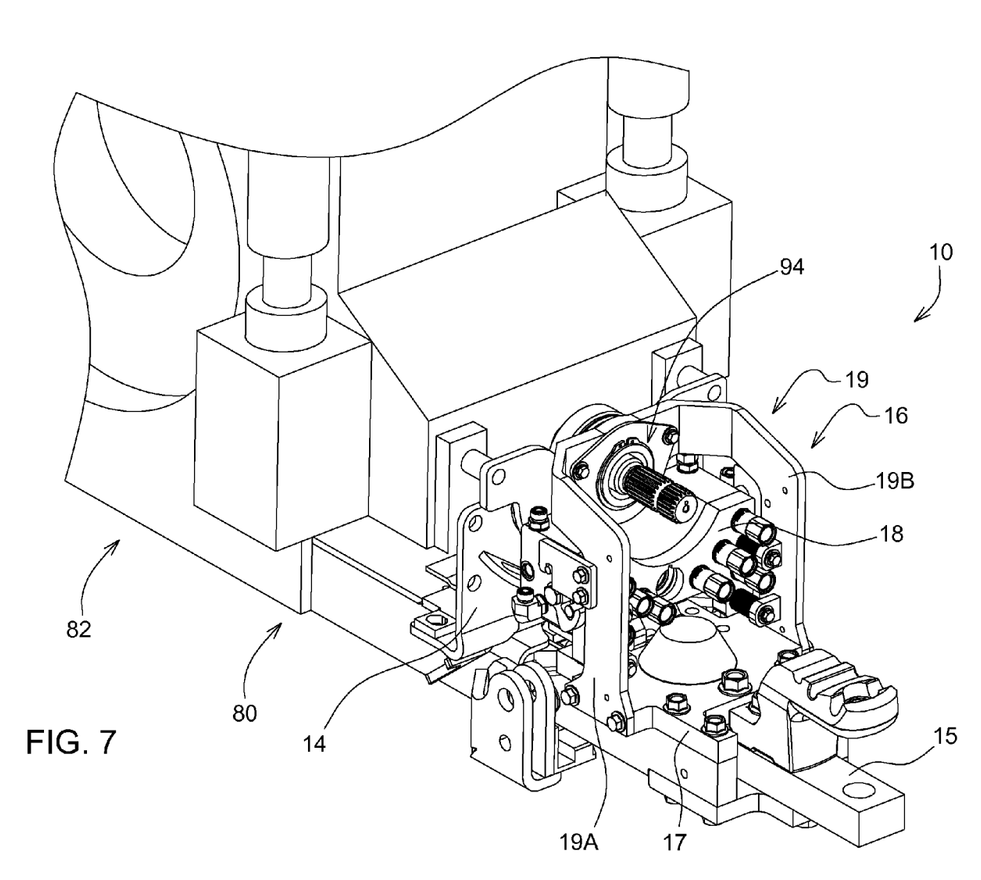
FIG. 7 is a perspective view of the coupling mechanism of FIG. 1 coupled to a pick up hitch.
Figure 8:
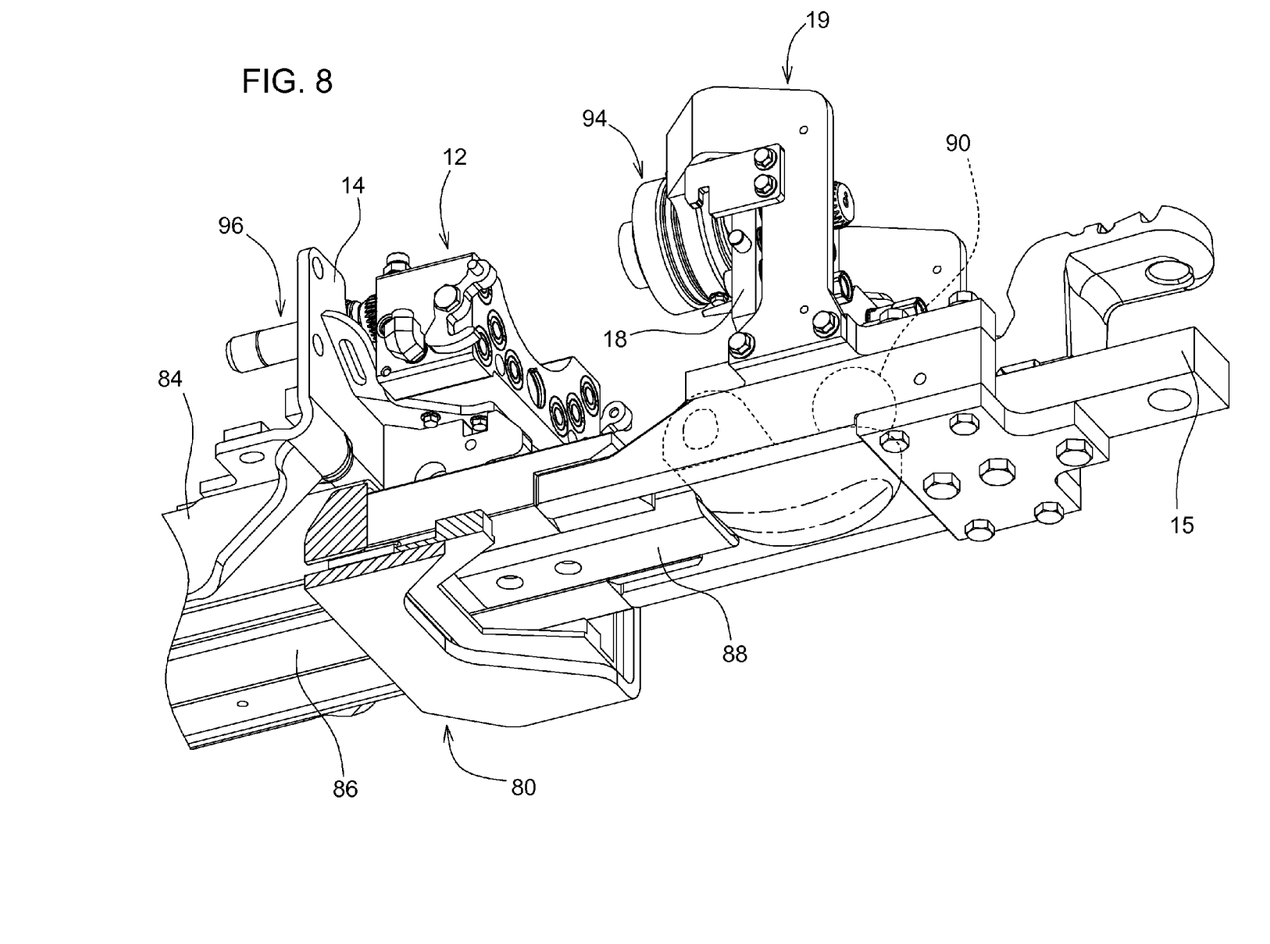
FIG. 8 is another perspective view of the coupling mechanism of FIG. 1 coupled to a pick up hitch.

A coupler plate or implement plate 18 is movably supported on the coupler frame 19. One or more hydraulic and/or electric implement couplers 20 are installed in the coupler plate 18. As best seen in FIGS. 2 and 4, support brackets 22 project inwardly from the coupler frame arms 19A and 19B. Each bracket 22 has a bore 24 which receives a support bolt 26. Each support bolt has a threaded end 28 which is threadably received by a corresponding threaded bore 30 in the coupler plate 18. A resilient spring member 32, such as a coil spring, is mounted around each bolt 26, between the coupler plate 18 and each bracket 22. Each spring 32 is biased to urge the coupler plate 18 towards the manifold 12. Alignment dowels 34 project from the coupler plate 18 towards the manifold 12 and are received by alignment bores 36 formed in the manifold. The manifold 12 supports tractor couplers 40 which are matingly engagable with the implement couplers 20. The coupler unit 16 may be pulled towards the manifold 12 by a conventional pick up hitch (FIGS. 7 and 8).

Figure 1:
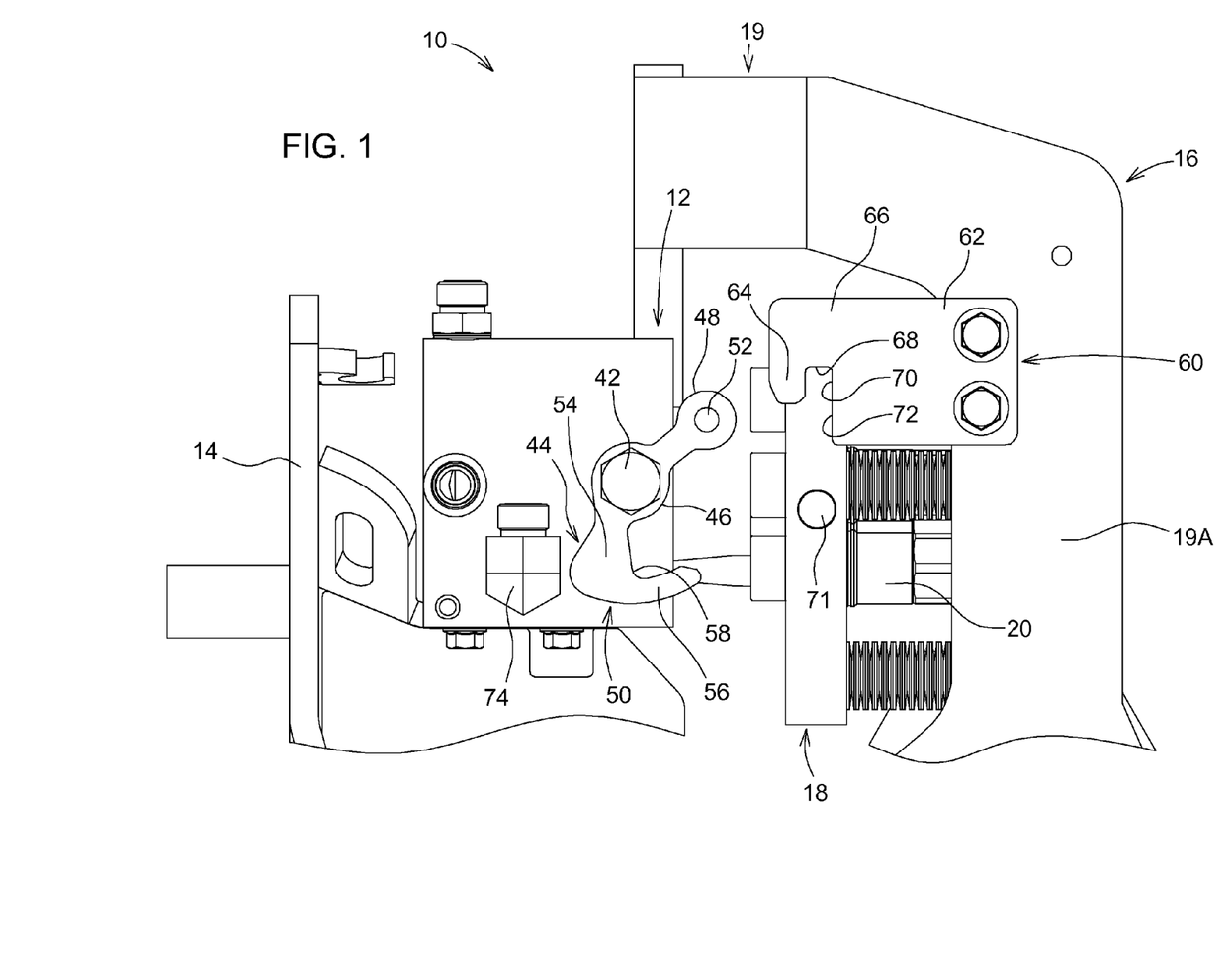
FIG. 1 is a side view of a coupling mechanism embodying the invention.

As best seen in FIG. 1, a pivot pin 42 projects laterally from a side of the manifold or housing 12. A lever member 44 is pivotally mounted on the pivot pin 42. The lever member 42 has a hub 46 which rotatably receives the pivot pin 42, a first arm 48 projecting away from the hub 46, and a second arm 50 projecting away from the hub 46. The lever member 42 also has a latch pin 52 which projects laterally away from an outer end of the first arm 48. The second arm 50 includes a first leg 54 which is joined to the hub 46 and a second leg 56 which extends away from the first leg 54. The legs 54 and 56 are angled with respect to each other to form a locking recess 58.

Also as best seen in FIG. 1, a latch member 60 is fixed, such as by bolts, to the coupler unit 16. The latch member 60 has a body 62, a latch finger 64 spaced apart from the body 62, and a spacer 66 which connects the latch finger 64 to the body 62. The body 62, the finger 64 and the spacer 66 form a slot 68 therebetween. The body 62 forms a slot wall 70 which is spaced apart from the finger 64 and which faces the finger 64. The body 62 also forms a latch wall 72 which is joined to the slot wall 70. A lock pin 71 projecting laterally from the coupler plate 18.

As best seen in FIGS. 1 and 2, a stop member 74 is formed by a hydraulic fitting which attached to the housing member 12 spaced apart from the pivot pin 42. The lever member 44 has an uncoupled position wherein gravity moves the first arm 48 towards the latch member 60 and moves the second arm 50 into engagement with the stop member 74.

Figure 3:
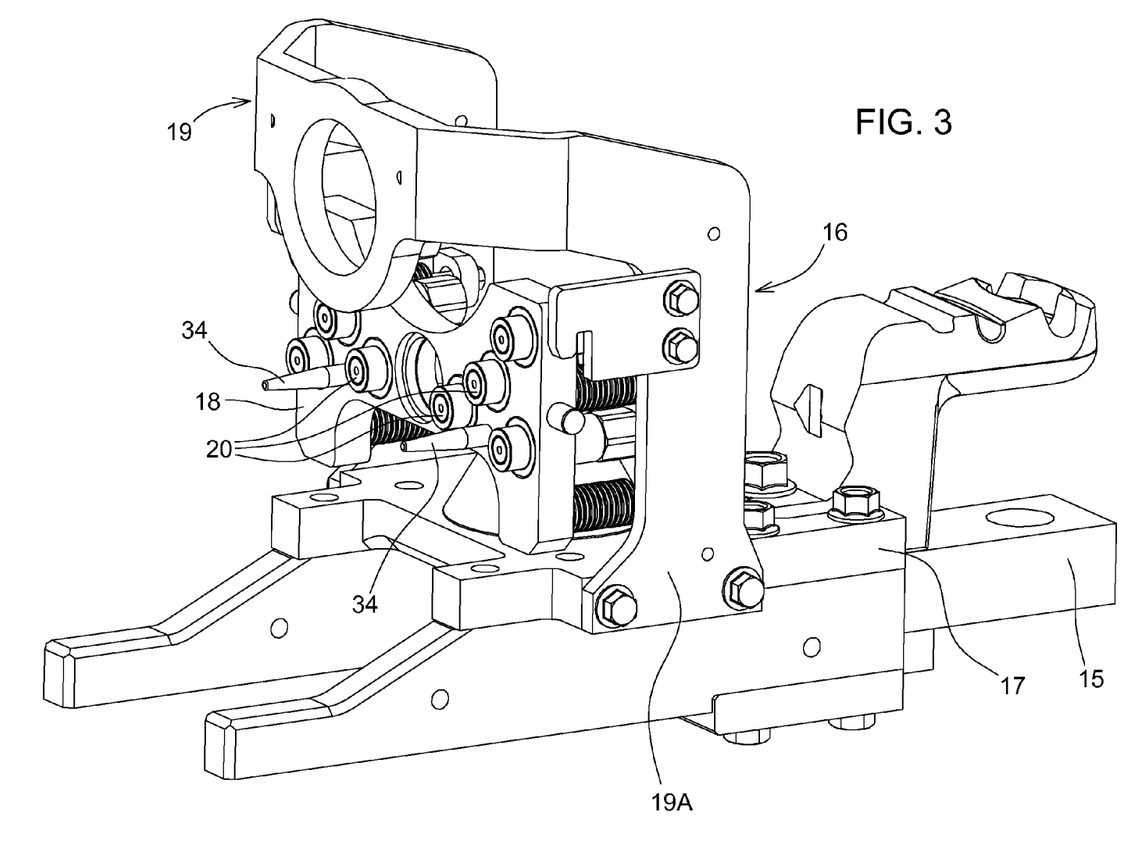
FIG. 3 is a perspective view of the implement coupler portion of FIG. 1.

As best seen in FIGS. 3 and 4, a pair of guide dowels 34 projects from the coupler plate 18. The manifold 12 includes guide bores 36 which receive the guide dowels 34.

Figure 5:
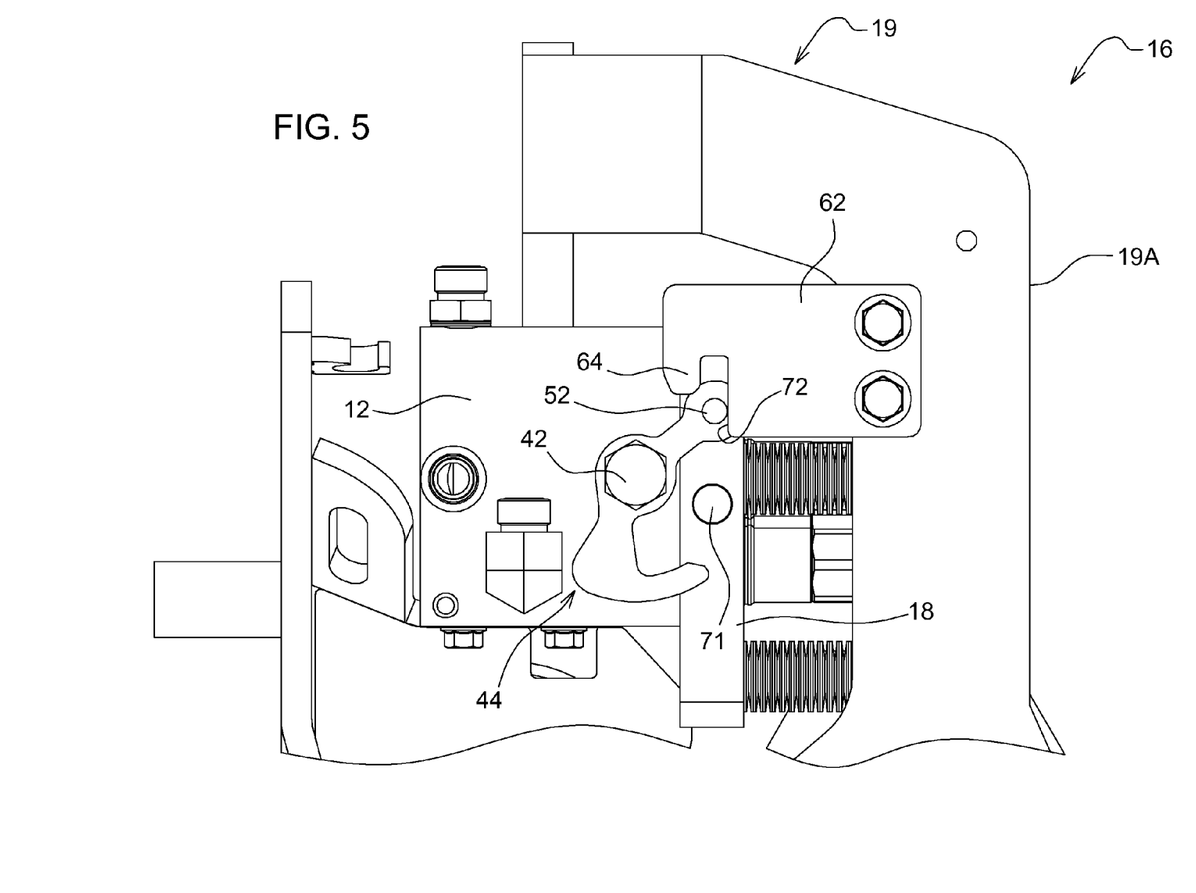
FIG. 5 is a side view of the coupling mechanism of FIG. 1 in an initial coupling condition.
Figure 6:
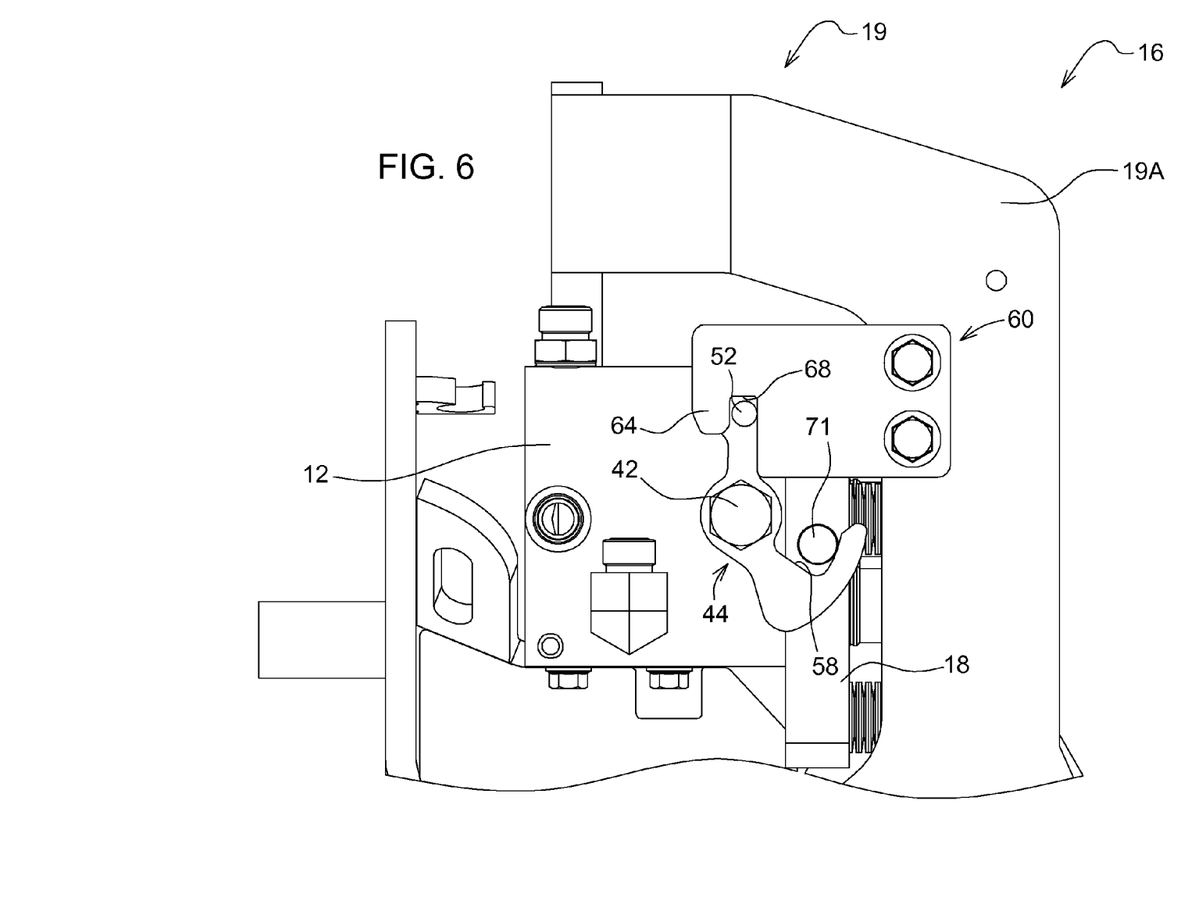
FIG. 6 is a side view of the coupling mechanism of FIG. 1 in a fully coupled condition.

As best seen in FIGS. 5 and 6, the latch wall 72 engages the latch pin 52 and pivots the lever member 44 and moves the latch pin 52 into the slot 68 as the coupler unit 16 moves towards the housing 12. Also, the second arm 50 moves to a locking position wherein the locking recess 58 receives the lock pin 71 as the lever member 44 is pivoted by the latch member 60.

Referring to FIGS. 7 and 8, a tractor pick up hitch 80 is mounted at the rear of a tractor frame part 82. The pick up hitch 80 supports the coupler mechanism 10 which includes the coupler structure 14 and the coupler unit 16. The pick up hitch 80 includes a fixed outer housing 84, a pivotal inner housing 86 and a drawbar 88 which is slidably received in the inner housing 86. A hitch ball 90 at the end of the drawbar is received by a downward opening socket 92 which is formed by the base 17. The implement coupler frame 19 supports an implement PTO coupler member 94 which is releasably engagable with a vehicle PTO device 96.

The result is a coupling mechanism which can automatically connect and lock flat face hydraulic quick couplers together using a conventional production pick up hitch without leaving the tractor cab. The hydraulic cylinder of a production pick up hitch brings the hydraulic flat face quick couplers together so that the coupling mechanism automatically mechanically locks the couplers together. A plate supports the implement hydraulic couplers facing a manifold which is attached to a frame of the pick up hitch. Springs movably hold the plate to a frame which is fixed to the implement. As the cylinder of the pick up hitch pulls the implement frame to the tractor, the plate contacts the manifold. The cylinder continues to pull the coupler frame towards the tractor, compressing the springs and preventing damage to the hydraulic couplers. This coupling mechanism complete the connection of the drawbar, power take off, hydraulic and electrical connections without requiring the operator to leave the cab.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A coupling assembly for coupling a towed implement to a vehicle, the implement having a tongue, and the vehicle having a pickup hitch having a drawbar slidable in a pivotal housing, the coupling assembly comprising:
a coupler manifold mounted to the vehicle, the coupler manifold supporting at least one vehicle coupler;
an implement coupler frame fixedly attached to the tongue; and
an implement plate movably coupled to the implement coupler frame, the implement plate supporting at least one implement coupler for mating engagement with the vehicle coupler;
wherein the implement coupler frame supports an implement PTO coupler member which is releasably engagable with a vehicle PTO device.

2. The coupling assembly of claim 1, wherein:
the manifold is engagable with the implement plate.

3. The coupling assembly of claim 2, wherein:
a support bracket projects from the coupler frame, the support bracket having a bore extending therethrough;
a support bolt is slidably received by the support bracket, an end of the support bolt is attached to the implement plate; and
a resilient spring member is biased to urge the implement plate towards the manifold.

4. The coupling assembly of claim 3, wherein:
the resilient spring member is mounted around the support bolt.

5. The coupling assembly of claim 2, further comprising:
a plurality of support brackets mounted to the coupler frame, each support bracket having a bore extending therethrough;
a plurality support bolts, each support bolt being slidably received by a corresponding support bracket, an end of each support bolt being attached to the implement plate; and
a plurality of resilient spring members, each spring member being biased to urge the implement plate towards the manifold.

6. The coupling assembly of claim 5, wherein:
each spring member is mounted around a corresponding support bolt.

7. The coupling assembly of claim 5, wherein:
each spring member comprises a coil spring.

8. The coupling assembly of claim 1, further comprising:
a resilient spring member biased to urge the implement plate towards the manifold.

9. A coupling assembly for coupling a towed implement to a vehicle including a coupler manifold mounted to the vehicle, the coupler manifold supporting at least one vehicle coupler, the coupling assembly comprising:
an implement coupler frame fixedly attached to the implement;
an implement plate movably coupled to the implement coupler frame, the implement plate supporting at least one implement coupler for mating engagement with the vehicle coupler;
a support bracket that projects from the coupler frame, the support bracket having a bore extending therethrough;
a support bolt is slidably received by the support bracket, an end of the support bolt is attached to the implement plate; and
a resilient spring member is biased to urge the implement plate towards the manifold.

10. The coupling assembly of claim 9, further comprising:
a resilient spring member biased to urge the implement plate towards the manifold.

11. The coupling assembly of claim 9, wherein:
the implement coupler frame supports an implement PTO coupler member which is releasably engagable with a vehicle PTO device.

12. The coupling assembly of claim 9, wherein:
the manifold is engagable with the implement plate.

13. The coupling assembly of claim 9, wherein:
the resilient spring member is mounted around the support bolt.

14. The coupling assembly of claim 12, wherein:
there are a plurality of support brackets mounted to the coupler frame, each support bracket having a bore extending therethrough;
there are a plurality support bolts, each support bolt being slidably received by a corresponding support bracket, an end of each support bolt being attached to the implement plate; and
there are a plurality of resilient spring members, each spring member being biased to urge the implement plate towards the manifold.

15. The coupling assembly of claim 14, wherein:
each spring member is mounted around a corresponding support bolt.

16. The coupling assembly of claim 14, wherein:
each spring member comprises a coil spring.

17. A coupling assembly for coupling a towed implement to a vehicle, the implement having a tongue, and the vehicle having a pickup hitch having a drawbar slidable in a pivotal housing and a coupler manifold mounted to the vehicle, the coupler manifold supporting at least one coupler, the coupling assembly comprising:
an implement coupler frame fixedly attached to the tongue, the implement coupler frame supporting an implement PTO coupler member which is releasably engagable with a vehicle PTO device;
an implement plate movably coupled to the implement coupler frame, the implement plate supporting at least one implement coupler for mating engagement with the vehicle coupler;
a plurality of support brackets mounted to the coupler frame, each support bracket having a bore extending therethrough;
a plurality support bolts, each support bolt being slidably received by a corresponding support bracket, an end of each support bolt being attached to the implement plate; and
a plurality of resilient spring members, each spring member being biased to urge the implement plate towards the manifold.

18. The coupling assembly of claim 17, wherein the implement coupler frame is configured to be pulled towards the coupler manifold by the pickup hitch.

19. The coupling assembly of claim 18, wherein coupling assembly can complete connections of at least one electrical connection, at least one hydraulic connection, and a PTO connection between the implement PTO coupler and the vehicle PTO device.

20. The coupling assembly of claim 18, wherein the implement plate includes a guide dowel that is received by a guide bore in the coupler manifold.

* * * * *